United States Patent

[11] 3,621,139

[72] Inventor Earl D. Gibson
Huntington Beach, Calif.
[21] Appl. No. 36,151
[22] Filed May 11, 1970
[45] Patented Nov. 16, 1971
[73] Assignee North American Rockwell Corporation

[54] DATA RECEIVER WITH INTERSYMBOL INTERFERENCE CORRECTION
7 Claims, 12 Drawing Figs.

[52] U.S. Cl. .......... 178/69 B, 340/146.1
[51] Int. Cl. .......... H04l 25/02
[50] Field of Search .......... 178/69 A, 69 B; 333/18; 340/146.1

[56] References Cited
UNITED STATES PATENTS 3,368,168 2/1968 Lucky .......... 333/18

*Primary Examiner*—Kathleen H. Claffy
*Assistant Examiner*—Douglas W. Olms
*Attorneys*—L. Lee Humphries, H. Fredrick Hamann and Edward Dugas

ABSTRACT: The system of the present invention utilizes previous digit decisions to correct a large part of the intersymbol interference of a received signal by subtracting the intersymbol interference components of a previously received signal from the received signal. The system is comprised of means fo delaying an input digital data signal having intersymbol interference components. A correction means receives the nondelayed and the delayed signal along with a corrected system output signal which is fed back to the correcting means from the system's output. The correcting means generates from the corrected system's output signal a new signal containing all bits normally associated with the output signal when it was first received and wherein the generated intersymbol interference signals are subtracted from the delayed and nondelayed input signals to provide corrected signals. The nondelayed signal is fed to an amplifier with a predetermined gain setting. The output from the amplifier and the delayed output from the correction means are summed together in a summing means. A sampler samples the summing means output at substantially the data bit rate. A threshold detector detects the level of the sampled signal to provide the corrected system's output signal.

INVENTOR.
EARL D. GIBSON
BY Edward Dugas
ATTORNEY

INVENTOR.
EARL D. GIBSON
BY Edward Dugas
ATTORNEY

INVENTOR.
EARL D. GIBSON
BY Edward Dugas
ATTORNEY

INVENTOR.
EARL D. GIBSON
BY Edward Dugas
ATTORNEY

INVENTOR.
EARL D. GIBSON
BY Edward Digas
ATTORNEY

INVENTOR.
EARL D. GIBSON
BY Edward Dugas
ATTORNEY

INVENTOR.
EARL D. GIBSON
BY Edward Dugas
ATTORNEY

INVENTOR.
EARL D. GIBSON

BY Edward Dugas
ATTORNEY

AN OUTPUT LOGIC CIRCUIT
FOR THE TWO DIVIDING LINE
CASE (TWO DIMINSIONS)

INVENTOR.
EARL D. GIBSON
BY Edward Dugas
ATTORNEY

INVENTOR.
EARL D. GIBSON
BY Edward Dugas
ATTORNEY

INVENTOR.
EARL D. GIBSON
BY Edward Dugas
ATTORNEY

DATA RECEIVER WITH INTERSYMBOL INTERFERENCE CORRECTION

BACKGROUND OF THE INVENTION

This invention relates to a system for receiving digital data under exceptionally high transmission rates which data has been affected by intersymbol interference, noise and other transmission disturbances. More particularly, this invention determines the value of a received digit by subtracting weighted components of previously received signals from the latter-received signals to effectively cancel out intersymbol interference caused by the components of previously evaluated digits summing together with the components of the latter-received digit. The transmission of digital data over transmission lines causes delay and amplitude distortions of the transmitted signal and subjects the transmitted signal to noise. These conditions are accentuated when the data rate is increased towards the Nyquist rate. In the past, a number of techniques have been used to correct for the transmission path distortion caused at lower transmission rates. For example, if the characteristics of the transmission line are known, it is possible to accomplish equalization by predistortion. That is, the signal to be transmitted itself is distorted in such a way that the additional line distortion alters the predistorted signal to produce a received signal having the desired waveshape. This particular technique is limited to those situations where the wave characteristics of the transmission line are constant and known.

Another technique to correct for delayed distortion on a transmission line involves the use of transversal equalizers. A transversal equalizer comprises a tapped delay line and a plurality of multipliers, each associated with a single tap of the delay line. Transversal equalizers are limited in that they cannot completely compensate for strong distortion of the signal without attenuating the signal much more than they attenuate the noise.

In U.S. Pat. application, Ser. No. 643,517, filed June 5, 1967, now U.S. Pat. No. 3,524,169 entitled "Impulse Response Correction System, " by Gerald K. McAuliffe and David M. Motley, assigned to North American Rockwell Corporation, the assignee of the present invention, there is described a system for adaptively using the impulse response of a transmission channel to derive therefrom a correction signal which, when combined with the signal being received, permits recovery of the transmitted data in essentially undistorted form. This is accomplished by storing previously received corrected data bits and cross correlating these stored bits with the signal being received, thereby obtaining the impulse response of the transmission channel. The cross correlation is achieved by digitally multiplying each of the *n* most recently received sampled data bits by the previously received corrected signal and integrating the products over time. A correction signal is then derived by digitally multiplying the measured impulse response values by the stored data in summing the products. This correction signal is then subtracted from a received signal to provide a correction signal which is both the system's output signal and the signal which is stored.

Another patent of interest is U.S. Pat. No. 3,368,168, entitled "Adaptive Equalizer for Digital Transmission Systems Having Means to Correlate Present Error Component with Past, Present and Future Received Data Bits," by R. W. Lucky. The system of the referenced patent continuously correlates samples of the output of a transversal equalizer with the received data bits to determine the polarity of the intersymbol interference components of the single-pulse impulse response of the transmission channel; and, by using these polarities, determines the direction of successive incremental adjustments of the attenuators associated with the taps of the equalizer. The intersymbol interference components of the effective impulse response of the transmission channel are estimated in the case of polar binary transmission by sampling the analog output of the transversal equalizer at the data transmission rate, slicing the samples to detect the received data sequence, subtracting the present standardized received data symbol from the present analog output sample to determine a present error component and correlating the present error component with past, present and future received data bits within the range of the equalizer to obtain a series of product terms corresponding to successive sampling instance. The product terms are them averaged over a number of sampling intervals. The polarity of these averaged values are next determined by a slicing circuit. The attenuators at each tap of the equalizer are finally incrementally adjusted in opposition to such polarity determinations.

Another patent of interest is U.S. Pat. No. 3,414,819, entitled "Digital Adaptive Equalizer System" by R. W. Lucky. The system of that patent is directed to an adaptive transversal equalizer for multilevel digital data in which attenuators connected to equally spaced taps are incrementally adjusted according to a correlation of a polarity of each received data signal with an error polarity component so as to minimize intersymbol interference. In summary, the adaptive equalization system of the referenced patent operates by digitizing the comparison of the analog received signal with the received data to obtain the polarity only of the error signal and not its actual magnitude.

SUMMARY OF THE INVENTION

The present invention is directed to a receiver system for detecting digital data bits from a distorted waveform input signal which input signal contains digital data bit information and intersymbol interference. The system in one of the preferred embodiments is comprised of a filter means which is connected to receive the distorted waveform input and to remove noise and other frequency components from the distorted waveform which frequency components are above the bandwidth of the receiver. The filtered signal is then sent to the delay means which means delays the signal a predetermined number of bit intervals. A correction means receives as inputs the delayed input signal and the distorted waveform received signal, along with a system's output signal which is fed back from the output of the receiver. The correction means operates upon the corrected receiver's output signal to provide a signal which is equal to the intersymbol interference caused by previously evaluated digits. The provided signal is the subtracted from the delayed filtered signal and the filtered signal to eliminate substantially all of the intersymbol interference contained in the signals so as to provide a partially corrected delayed filtered signal. Amplifier means amplify the partially corrected undelayed filtered signal by a preselected gain so as to maximize the linear separations between different levels of the received digital data signal. Summing means are provided for summing the output signal from the amplifier means with the partially corrected filtered signal. A sampling means, sampling at substantially the bit rate, samples the output signal from the summing means. A threshold detector is then used to sense the output from the summing means to determine if the sampled signal is above or below a predetermined level.

From the foregoing it, therefore, can be seen that a primary object of the present invention is to provide a novel receiver for receiving signals containing intersymbol interference;

It is another object of the present invention to provide a receiver having improved separation between levels of the received signal;

It is a further object of the present invention to provide a receiver which uses a feedback signal to provide correction for later received signals.

These and other objects of the present invention will become more apparent when taken in conjunction with the following description and drawings which drawings form a part of this application and wherein like characters indicate like parts.

DESCRIPTION OF THE PREFERRED EMBODIMENTS

The purpose of this invention is to receive digital data from memory read devices or from communication channels in the presence of intersymbol interference and noise. An important special purpose is to increase the rate at which data can be received under these conditions.

The general approach is based upon the received pulse response, or the signal received for a single-isolated digit, as seen at the input of the device that is the subject of this invention.

Figure 1:
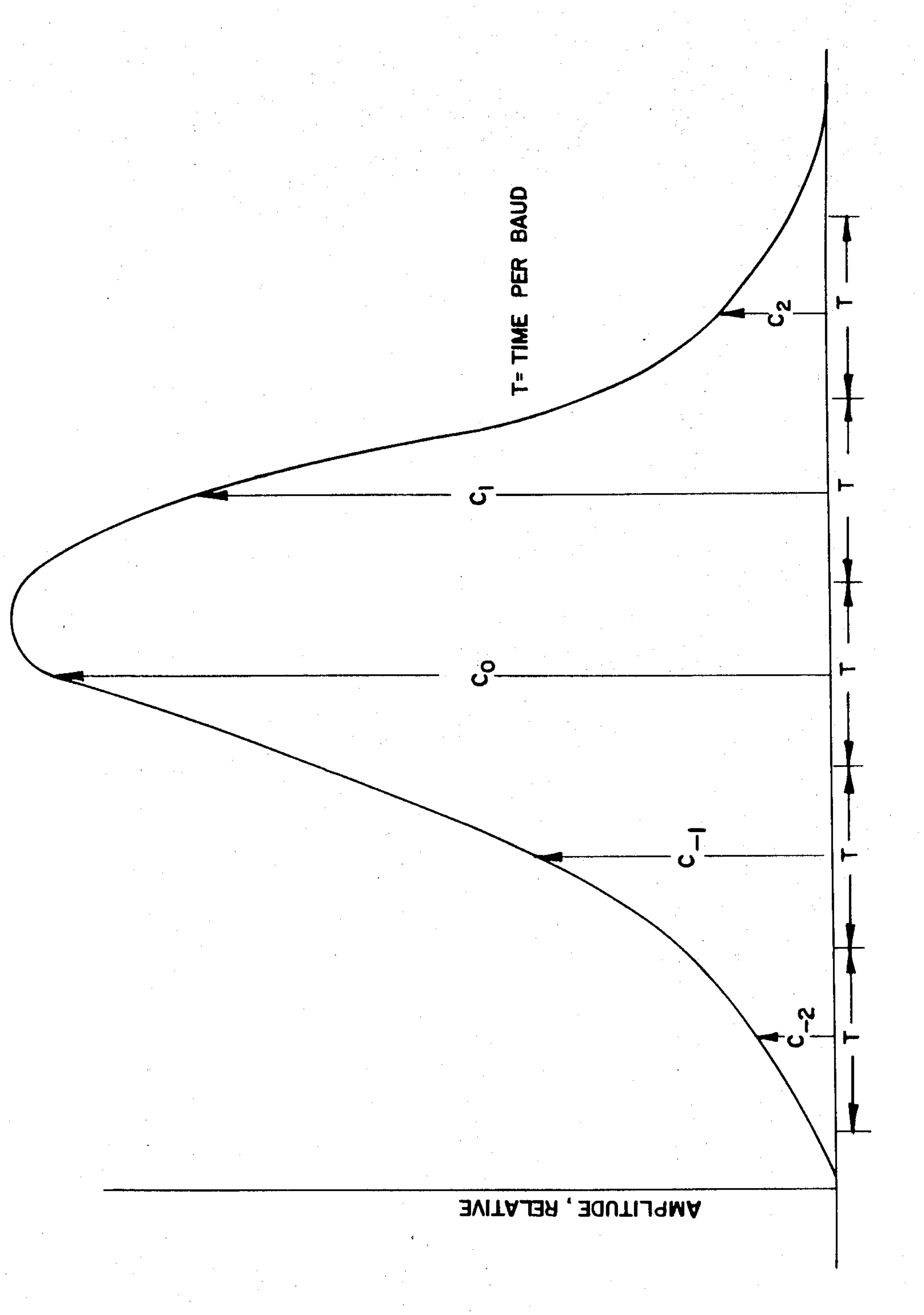
FIG. 1 is a chart illustrating a typical system pulse response with associated timing of pulse response samples.

FIG. 1 shows an example of such a pulse response. Let samples of the amplitude of the pulse response taken at the centers of the digit time intervals be ... $c_{-2}$, $c_{-1}$, $c_0$, $c_1$, $c_2$ as shown in FIG. 1. The main pulse response sample utilized in evaluating each digit is $c_0$, although one or more other pulse response samples will also be utilized and the total received signal will contain intersymbol interference among the pulse responses received for several digits. When a stream of digits is transmitted, or read from a memory, the $i^{th}$ signal is $$r_i=\sum_{all} kc_k d_{i-k} \qquad (1)$$

where $c_k$ is the $k^{th}$ sample of the received pulse response, $d_i$ is the $i^{th}$ digit read from the memory; and, the samples of the total signal are also taken at the centers of the received digit time intervals. Thus, because of intersymbol interference, each received signal sample is dependent upon a number of digit values. For evaluating each received digit, the receiver uses the received signal, $r(t)$, and a delayed replica of this signal, $r(t-T)$, where the delay T is equal to one baud (or digit time) interval. For evaluating the $i^{th}$ digit, $d_i$, the receiver uses $r_i$ and $r_{i-1}$, which are the instantaneous amplitudes of $r(t)$ and $r(t-T)$, respectively at the time of sampling for the evaluation of $d_i$. These two samples are related to the pulse response samples and the transmitted digit values as follows:

$$r_{i-1}=c_{-2}d_{i+1}=c_{-1}d_i+c_0d_{i-1}+c_1d_{i-2}+c_2d_{i-3} \qquad (2)$$

$$r_i=c_{-2}d_{i+2}+c_{-1}d_{i+1}+c_0d_i+c_1d_{i-1}+c_2d_{i-2} \qquad (3)$$

assuming that the significant samples of the pulse response are $c_{-2}$ through $c_2$, which was true in our memory read application.

Figure 2:
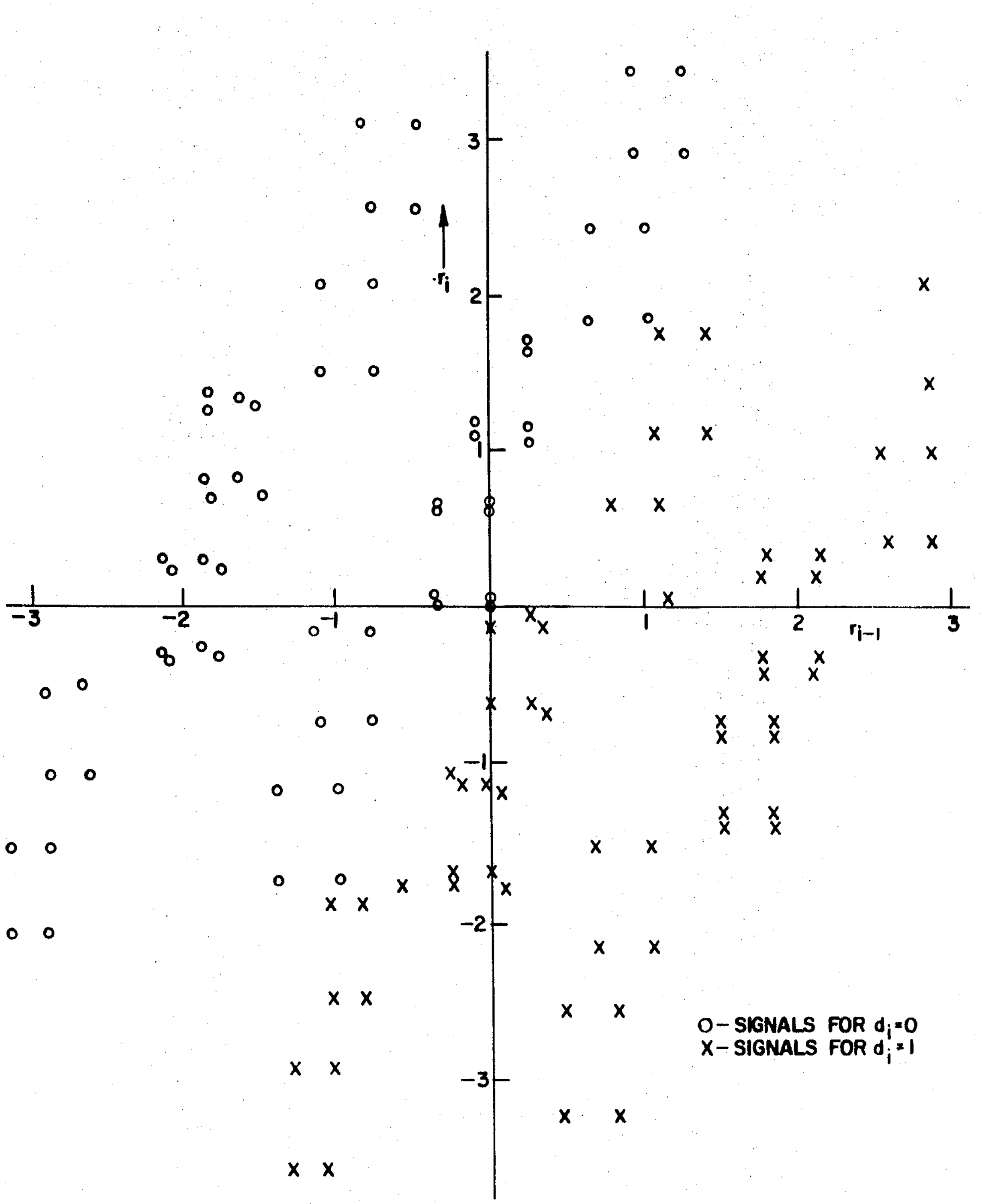
FIG. 2 is a chart depicting possible received signals within a two-digit time interval before correction by the present invention.

FIG. 2 presents a representative two-dimensional plot of these two signals samples for binary signaling, including the intersymbol interference involved. The distance along each axis represents one of the two instantaneous signal amplitudes, $r_{i-1}$ and $r_i$. From these two instantaneous signal amplitudes the receiver is to evaluate the digit $d_i$. The small circles and X's represent possible received signals for $d_i=0$ and $d_i=1$, respectively. Note that the 0's and 1's are positioned such that separation and detection cannot be easily accomplished.

Ordinarily, most of the intersymbol interference affecting the digit presently being evaluated, $d_i$, arises from digits previously evaluated $d_{i-1}$, $d_{i-2}$, $d_{i-3}$, etc. Therefore, in a receiver with a very low error rate it is possible to use these previous digit decisions and the known pulse response samples, the $c$'s, to eliminate most of the intersymbol interference see equations (1), (2) and (3). One device in the applicant's receiver removes this intersymbol interference associated with previous decisions. Then, the two signal samples $r_{i-1}$ and $r_i$ are converted to $$r'_{i-1}=\ldots+c_{-2}d_{i+1}+c_{-1}d_i \qquad (4)$$

$$r'_i=\ldots+c_{-2}d_{i+2}+c_{-1}d_{i+1}+c_0d_i \qquad (5)$$

Figure 3:
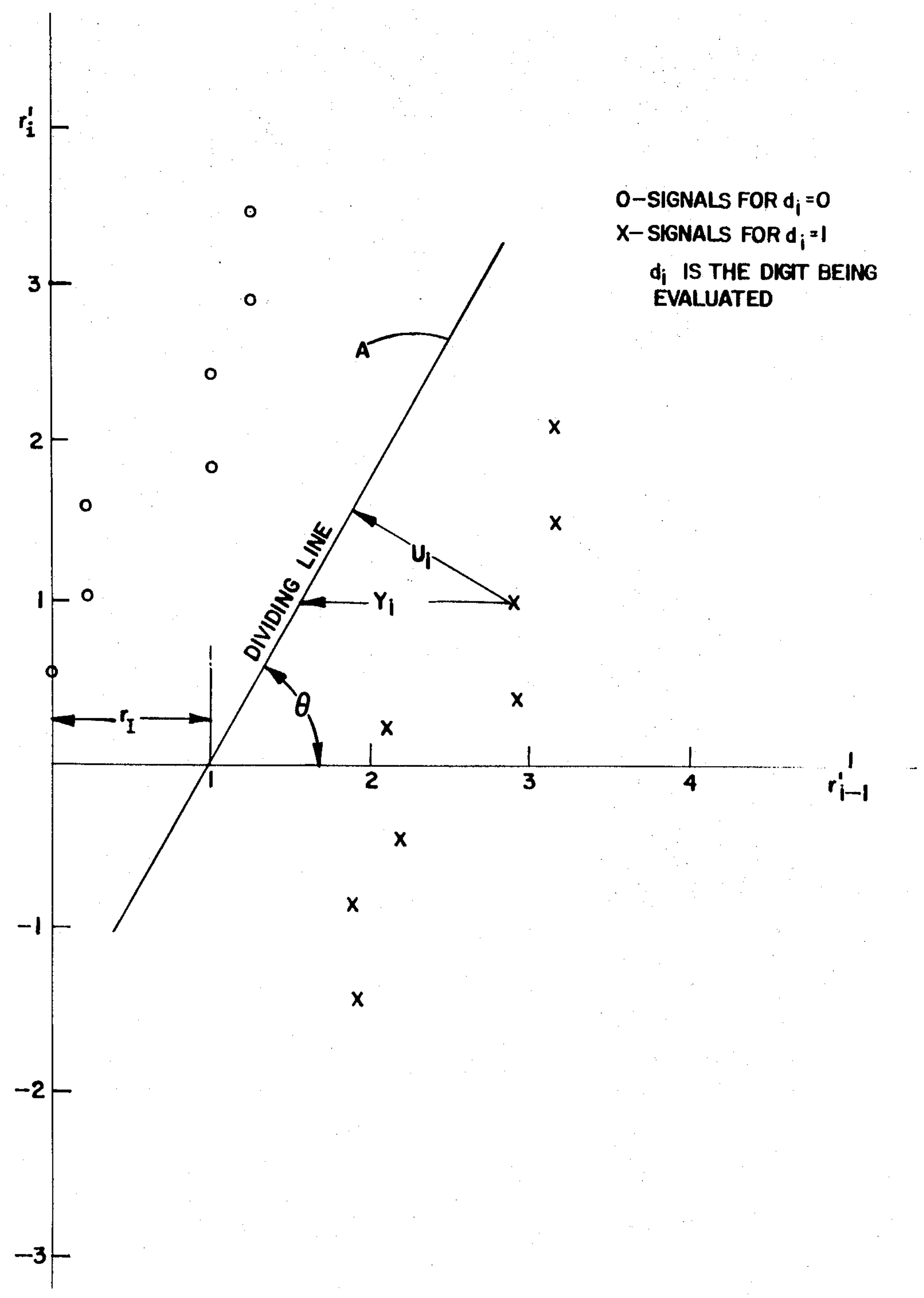
FIG. 3 illustrates possible received signals within a two-digit time interval after passage through the part of the subject receiver that removes the intersymbol interference caused by previously evaluated digits.

FIG. 3 presents a two-dimensional signal space plot $r'_{i-1}$ and $r'_i$, the two signal samples after processing through a correction device in the applicant's receiver. Now, in contrast to the situation shown in FIG. 2, there is a useable separation between the possible signals received for $d_i=0$ and the possible signals received for $d_i=1$, considering all the possible combinations of the remaining intersymbol interference terms. A dividing line A, FIG. 3, is now drawn between the two levels of signals. The invention establishes the optimum dividing line, which maximizes the minimum distance between the received signal and the dividing line (the distance between the dividing line and that possible received signal which is closest to the dividing line), so that maximum margin for noise is obtained. A simple equation for the horizontal distance from the received signal to the dividing line A is as follows:

$$Y_i=r'_{i-1}+Gr'_i-r_t \qquad (6)$$

where $$G=-\cot\theta \qquad (7)$$

and $r_t$ is the intersection of the dividing line A with the $r'_{i-1}$ axis and $\theta$ is the angle between the dividing line and the $r'_{i-1}$ axis.

To implement this equation, we set G and $r_t$ to establish the best straight line division of the signal area. Then in order for noise to cause an error, the noise must carry the received signal across the dividing line. If the signal plus noise at the receiver input is on the wrong side of the optimum dividing line, there is no simple receiver that can avoid an error, even with applicant's decision feedback circuit.

Figure 4:
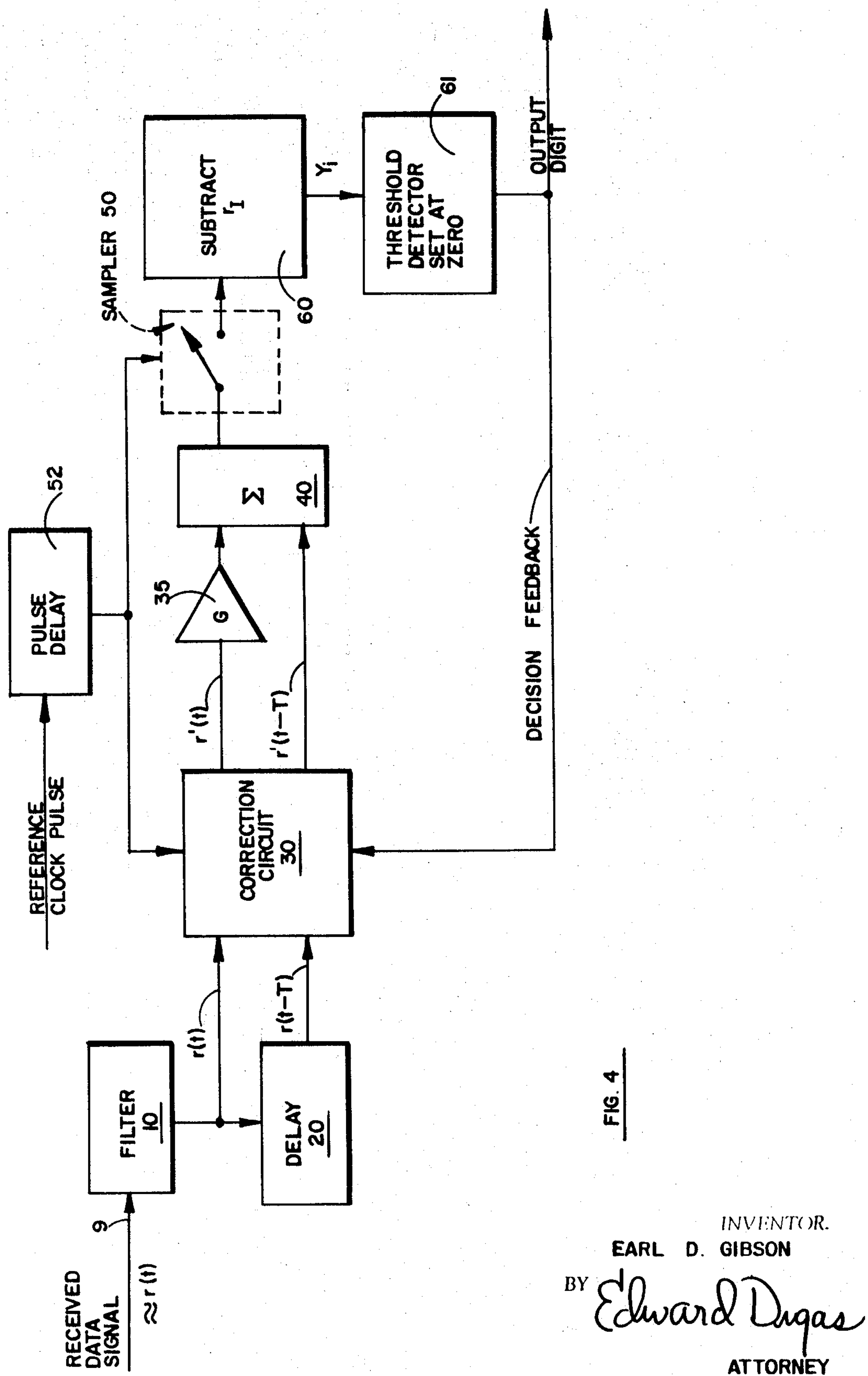
FIG. 4 illustrates in schematic block form the preferred receiver embodiment of the present invention.

Referring to the preferred embodiment illustrated in FIG. 4, the received data signal 9 is fed to a filter 10. The received data signal 9 is a distorted waveform signal which contains digital data bit information and intersymbol interference components. The filter 10 is designed to attenuate the noise components outside the signal bandwidth as much as feasible without substantially modifying the received signal. For the particular memory read application with the pulse response in FIG. 1 this filter has approximately a flat amplitude-frequency characteristic at frequencies between zero and approximately one-fourth megahertz. Beyond one-fourth megahertz the filter attenuation increases rapidly with increasing frequency to obtain about 30 db. attenuation at frequencies above one-half megahertz. In general for other applications, this filter should be flat over the bandwidth that includes about 90 percent of the signal energy and then roll off rapidly at frequencies above this band.

The output signal $r(t)$ from filter 10 is then fed to the delay circuit 20 and to the correction circuit 30. The delay 2 in FIG. 4 delays the signal by one baud time interval, T, without otherwise changing the signal. Thus at the time the digit $d_i$ is being evaluated $r(t)$ and and $r(t-T)$ appear at the input and output, respectively, of the delay 20 in FIG. 4. Amplitude samples of $r(t)$ and $r(t-T)$, which are conceptually (not physically) taken at the center of the $i^{th}$ baud time interval are $r_i$ and $r_{i-1}$, respectively. Note: the actual physical sampling will occur after further operations on $r(t)$ and $r(t-T)$ but, it is the sample (or instantaneous) amplitudes, not the continuous signals, that we will base our evaluation of the digit $d_i$ upon. These two samples are related to the pulse response samples and the transmitted digit values as previously expressed by equations (2) and (3). The correction circuit 30 receives as inputs the signals $r(t)$ and $r(t-T)$ and a decision feedback signal. The decision feedback signal represents the receiver's evaluation of the latest received digit, as explained below.

The signals $r(t)$ and $r(t-T)$ contain parts of pulse responses from not only the digit being evaluated, but from several intersymbol interference bits. The decision feedback signal when processed in correction circuit 30 is converted into signals with nearly all of the interference simulated. In particular the intersymbol interference arising from previously evaluated digits is simulated. The simulated terms are then subtracted from the signals $r(t)$ and $r(t-T)$ to provide corrected signals $r'(t)$ and $r'(t-T)$. The instantaneous amplitudes of these corrected signals at the centers of the $^{th}$ digit time interval were expressed by equations (4) and (5). The method of achieving this correction for previous decisions will be explained below. The corrected signal $r'(t)$ is then fed to amplifier 35 having a gain setting G; and the signal $r'(t-T)$ is then fed to summing means 40 to provide the output signal:

$$r'(t-T)+Gr'(t) \qquad (8)$$

A sampler 50 samples the output from summing means 40, at the bit rate of transmission. Reference clock pulses for controlling the sample timing are ordinarily obtained from a separate device not associated with this invention. For example, when this invention is used with a rotating memory, the data bits are normally recorded at prearranged points in the memory rotation. Then, during reading from the memory, an external timing device generates clock pulses for timing the sampling in this invention to synchronize this sampling with the memory rotation points at which the corresponding data bits were recorded. The sample for evaluating the $i^{th}$ digit $d_i$ should occur shortly before the peak of the system response to $d_i$ (the part of $r(t)$ associated with $d_i$) reaches its peak. More precisely, the optimum sample timing is approximately that timing which maximizes $c_o-c_{-1}$, a difference in pulse response sample amplitudes, see FIG. 1. The sample timing can also be obtained from a controlled stable oscillator synchronized to the received bit rate.

The externally derived timing pulses are fed to a pulse delay circuit 52 which adjusts the delay of these timing pulses fed to actuate the sampler 50 so as to compensate for any delay in the received signal caused by the signal passing through the system.

Since the needed delay is normally fixed and known in advance in memory read applications, the pulse delay circuit 52 can be a simple conventional device for delaying narrow timing pulses by a fixed amount. In data communications applications where the needed delay varies with the channel, automatic timing recovery can be achieved by synchronizing a stable clock with zero crossings of the received signal, as in previous data modem designs such as our model (described in U.S. Pat. application Ser. No. 10,332, filed Feb. 11, 1970, entitled "High Speed Digital Transmission System," by Earl D. Gibson, which application is assigned to North American Rockwell Corporation, the assignee of the present invention). When automatic timing recovery is used, a fixed timing delay is still inserted in order to obtain the sample timing that approximately maximizes $c_o-c_{-1}$, as discussed above.

After sampling, the signal fed to the subtract $r_t$ circuit 60 is $r'_i+Gr'_{i-1}$. The subtract $r_t$ circuit 60 subtracts a fixed predetermined voltage from the amplitude of the narrow pulse from the sampler. The amplitude of the pulse from the subtract $r_t$ circuit at the time of evaluation of the $i^{th}$ digit is then $$Y_i=r'_{i-1}+Gr'_i-r_t \qquad (9)$$

where G is adjusted to be equal to $-\cot\theta$ and $\theta$ is the phase angle shown in FIG. 3. A comparison of equation (9) with FIG. 4 will help the reader to see how the equipment converts the received signal into the voltage $Y_i$ at the time of evaluating the digit $d_i$. Recall that $Y_i$ is proportional to the horizontal distance between the received signal used for evaluating $d_i$ and the dividing line in FIG. 3.

Normally, the adjustment G is fixed and calculated in advance. From known data concerning the system pulse response and the baud rate a signal area plot such as FIG. 3 can be plotted by using equations such as equations (4) and (5), and, an approximately optimum signal area dividing line can be drawn on the plot by inspection. Then, the needed adjustment G and $r_t$ can be obtained from this plot by recalling equation (7) and the associated definitions of G and $r_t$.

The signal $Y_i$ goes to the threshold detector 61, which has its threshold level set at zero. If the signal $Y_i$ is positive, the threshold detector generates a positive output pulse indicating that the digit $d_i=1$. Otherwise, the threshold detector generates a negative output pulse, which represents a decision that the digit $d_i$ has the value $d_i=0$.

Ordinarily, the threshold detector generates an output pulse of one polarity for $d_i=0$ and output pulse of the opposite polarity when $d_i=1$. However, any two different signal levels $V_1$ and $V_2$ can be used to represent the two binary digits.

Referring to FIGS. 3 and 4, the values of G and $r_t$ are set to establish the best straight line division of the signal area. Then, in order to cause an error, the noise must carry the received signal across the dividing line. If the signal plus noise at the receiver input is on the wrong side of the optimum dividing line, the receiver will make an error.

The subtract $r_t$ circuit can be eliminated by setting the threshold detector at the voltage $r_t$ instead of at zero. Then, the threshold detector would generate a binary space signal (such as a positive pulse) when the input voltage to the threshold detector exceeds $r_t$ and would otherwise generate a binary mark signal (such as a negative pulse).

Figure 5:
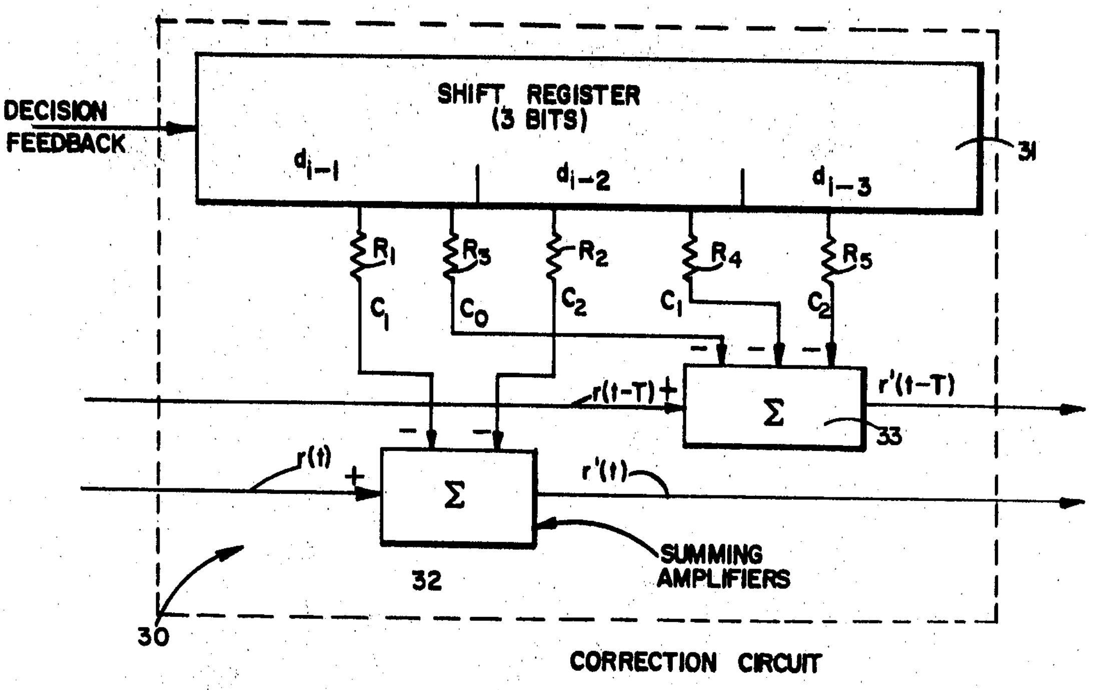
FIG. 5 illustrates in block schematic form a correction circuit for use in the receiver illustrated in FIG. 4.

Referring now to FIG. 5, the correction circuit contains a three-bit shift register 31 which receives as its input the bit decisions from the threshold detector. A pair of summing amplifiers 32 and 33 receive as inputs the signals $r(t)$ and $r(t-T)$, respectively. Resistors $R_1$ and $R_2$ are set to provide voltage (or current) gains proportional to the pulse response samples $c_1$ and $c_2$, respectively, of FIG. 1. Resistors $R_3$, $R_4$ and $R_5$ are set to provide voltage gains proportional to $c_o$, $c_1$ and $c_2$, respectively. The first bit signal from the shift register 31 is fed via resistor $R_1$ to the summing means 32. The second bit signal from shift register 31 is sent via resistor $R_2$ to summer 32. The output of summer 32 is $r'(t)$. The first bit signal is fed via resistor $R_4$ to summing means 33. The second bit signal is fed via resistor $R_4$ to summing means 33 and the third bit signal is fed via resistor $R_5$ to summing means 33. The output of summing means 33 is the signal $r'(t-T)$.

From equation (3) it can be seen that the feedback signal needed to correct $r_i$, or $r(t)$, for the intersymbol interference caused by the previously evaluated digits $d_{i-1}$ and $d_{i-2}$ is $c_1d_{i-1}+c_2d_{i-2}$. From FIG. 5 we see that this signal is subtracted from $r(t)$ by the summing amplifier 32. Similarly, summing amplifier 33 subtracts the needed feedback correction $c_od_{i-1}+c_1d_{i-2}+c_2d_{i-3}$ from $r(t-T)$ to obtain $r'(t-T)$. These actions of the summing amplifiers 32 and 33 will have the same effect upon the sampled signal Y as if we had directly converted $r_i$ into $r'_i$ and $r'_{i-1}$ instead of using partly continuous signals at this point. (See equations (2) through (6)). In other words, although the circuitry ahead of the sampler is working with partly continuous signals, we will ultimately be concerned with only the instantaneous values of these signals at the sampling times.

The circuitry shown in FIG. 5 was designed for the specific case in which there are two significant pulse response samples following $c_o$, which is the main pulse response sample utilized in evaluating each digit. When there are $n$ significant pulse response samples following $c_o$ the shift register is extended to contain $kn+1$ stages in this case wherein two signal samples are being utilized to evaluate each digit. Then, the number of resistors feeding into each summing amplifier is expanded accordingly. In the general case, the signal the signal $c_1d_{i-1}+c_2d_{i-2}+c_3d_{i-3}+c_4d_{i-4}$ is subtracted from $r(t-T)$ and the signal $c_1d_{i-1}+c_2d_{i-2}+c_2d_{i-2}+c_3d_{i-3}+\ldots c_nd_{i-n}$ is subtracted from $r(t)$.

Figure 6:
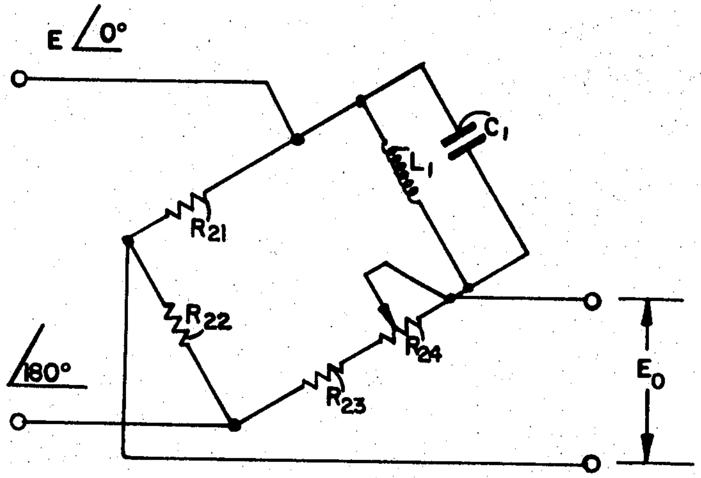
FIG. 6 illustrates in schematic form a delay circuit for use in the receiver illustrated in FIG. 4.

The delay 20, FIG. 4, needs to be an analog delay stage with low distortion, or a digital device that approximates a low-distortion delay of an analog signal. The delay should have an approximately flat amplitude-frequency characteristic and an approximately linear delay-frequency characteristic across the bandwidth of the significant signal frequencies. FIG. 6 shows one means of obtaining such a delay, a bridge circuit. The transfer function of this bridge is $$H(s)=\frac{K\left[\frac{s^2}{\omega_n^2}-\frac{2\zeta}{\omega_n}+1\right]}{\frac{s^2}{\omega_n^2}+\frac{2\zeta s}{\omega_n}+1}$$

where $$\omega_n=\sqrt{\frac{1}{LC}}\text{ and }\frac{2\zeta}{\omega_n}=\frac{L}{R_{23}+R_{24}}$$

The L, C, and R's are as labeled in FIG. 6, $\zeta$ is a "damping factor," $\omega_n$ is the "break frequency" and $\kappa$ is a constant. When L and the R's are selected so that $\zeta_1=0.7$, the phase curve is very nearly linear from $\omega=o$ to $\omega=\omega_n$ and the amplitude is constant with frequency. Therefore, if $\omega_n$ is set at the highest significant signal frequency or higher, the signal can be delayed with negligible distortion. The maximum delay obtainable per stage (bridge circuit) is then $1/2f_{max}$, where $f_{max}$ is the highest significant frequency component. In our memory read application, where the highest significant frequency is approximately one-half megahertz, the maximum delay obtainable per stage is about 1 microsecond. For a signal baud duration of 1.4 microseconds, for example, we would set $\omega_n$ at $\pi/0.7$ and obtain the 1.4 microseconds delay from two stages. Each delay stage is driven by amplifiers to prevent grounding or loading from substantially changing the transfer function of the bridge.

Instead of basing the implementation upon the horizontal distance $Y_1$ to the dividing line we could base it upon the perpendicular distance $U_i$ see FIG. 3. It can be shown that, regardless of whether we base the implementation upon $Y_i$ or $U_i$ if we properly set the adjustments to obtain the optimum dividing line, we obtain the best performance possible under the combined effects of intersymbol interference and noise when using only two signal samples (two signal space dimensions) in evaluating each digit. Also, the performance is approximately the best possible from any receiver that observes the continuous signal over a two baud time interval for making each decision.

Figure 7:
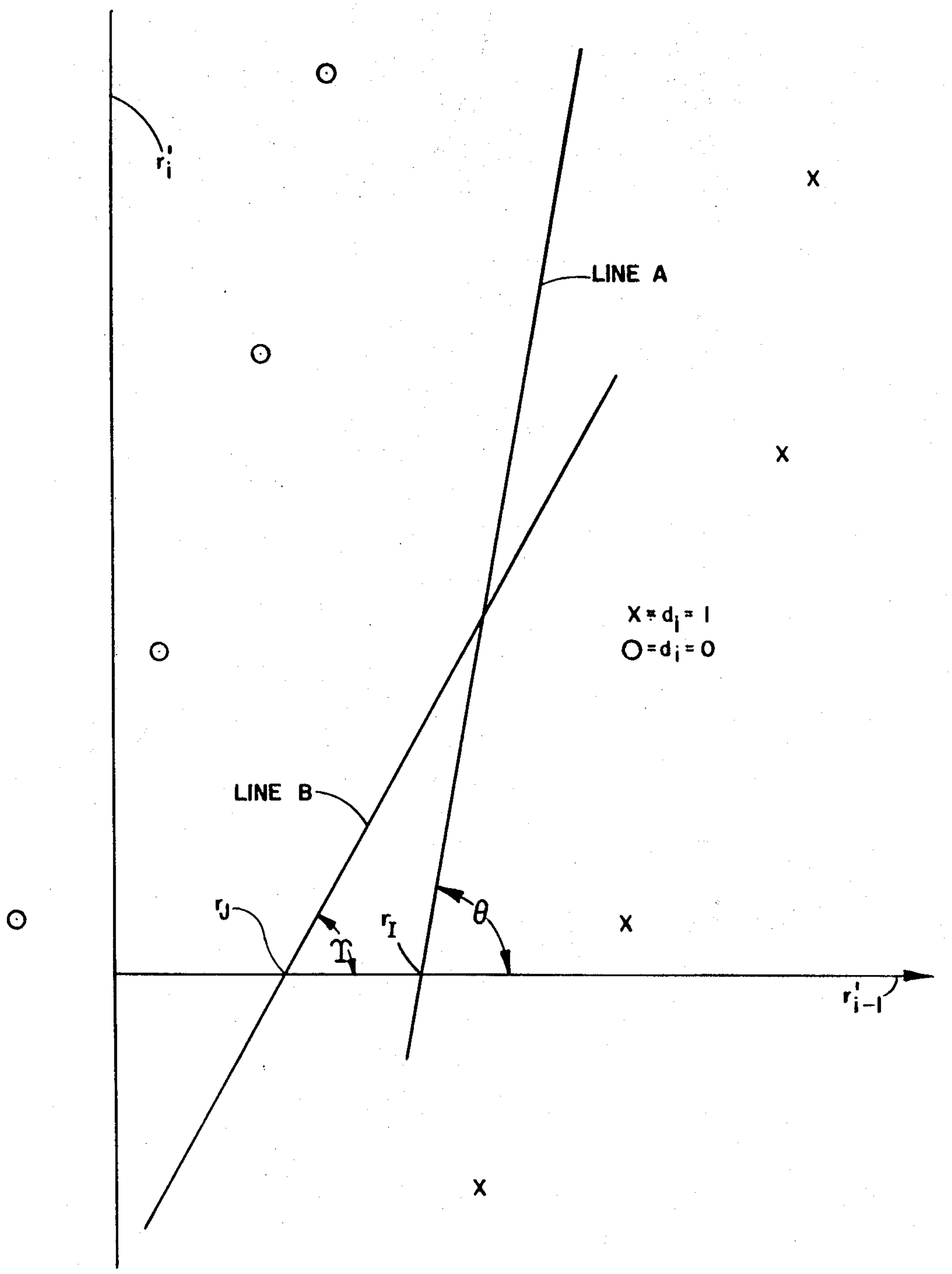
FIG. 7 illustrates in chart form the receiving characteristics of a second embodiment of the present invention.

The aforementioned approach of establishing a dividing (or separating) line with two signal space (or area) dimensions can be extended to any number of signal space dimensions and any number of separating planes or hyperplanes. The number of dimensions equals the number of signal samples used to evaluate each digit. Referring to FIG. 7 wherein is shown a second signal plot which utilizes binary signals with two dimensions and two dividing lines, A and B. FIG. 7 specifically represents signals received within a 2T-second interval, where T is the time per received digit and is 1.4 microseconds in out first memory read application used for illustrative purposes in this disclosure. Dividing line A makes an angle $\theta$ with the axis $r'_{i-1}$ and dividing line B makes an angle $\gamma$ with the axis $r'_{i-1}$. Dividing line A intersects the $r'_{i-1}$ axis at $r_i$ and dividing line B intersects the $r'_{i-1}$ axis at point $r_j$.

In FIG. 7, when the received signal plus noise falls to the left of both line A and line B, the received digit is interpreted as $d_i=0$. Otherwise the received digit is interpreted as $d_i=1$. From the location of the signals in FIG. 7 it can be seen that we obtain better separation of the signal area by using both line A and line B than is possible by using any single dividing line.

Figure 8:
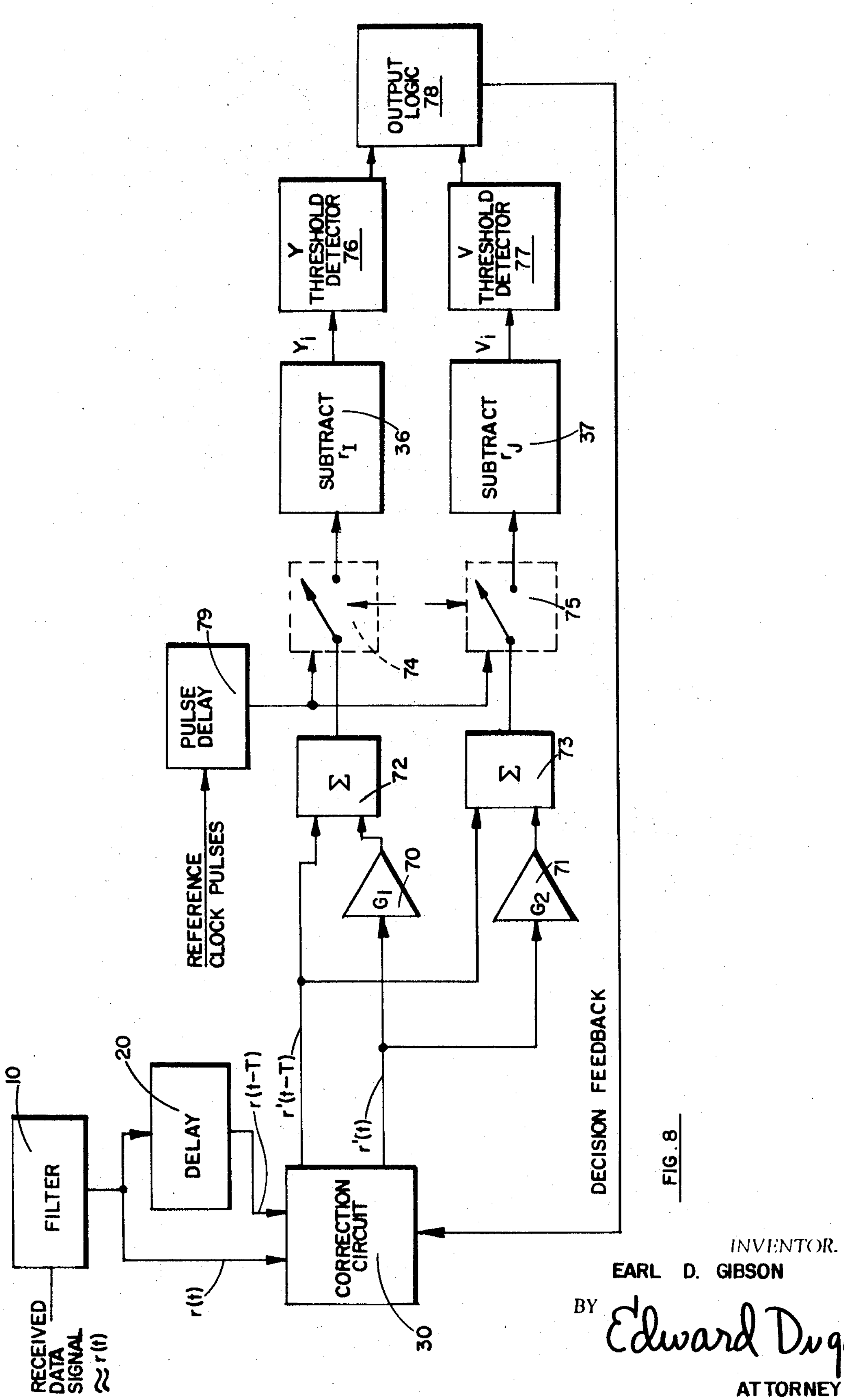
FIG. 8 illustrates in schematic block form a second receiver embodiment of the present invention.

FIG. 8 illustrates the basic implementation for providing the two dividing line operation disclosed in FIG. 7. The received data signal 9 is fed to the filter 10, which is the same as in FIG. 4, and from there to a delay means 20 and to a correction circuit 30. The correction circuit 30 also receives as an input the decision feedback signal. The decision feedback signal is modified in the correction circuit 30 and is subtracted from signals $r(t)$ and $r(t-T)$ to provide signals $r'(t)$ and $r'(t-T)$. The correction circuit 30 is the same as in FIG. 5 except for possible variations in the number of stages, depending upon the length of the trailing part of the system pulse response.

Figure 9:
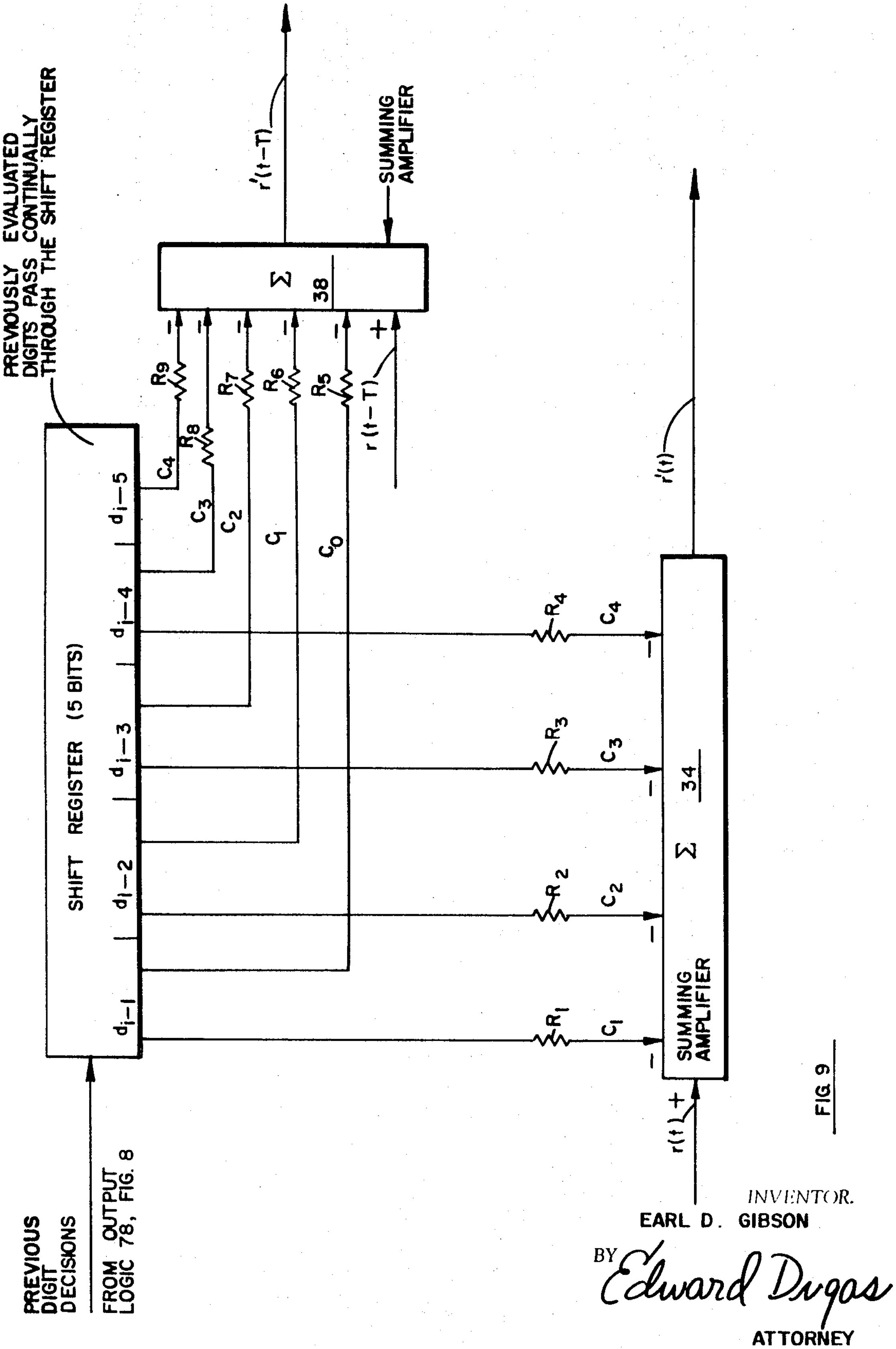
FIG. 9 illustrates in schematic block form a circuit for correcting previous decisions which circuit is incorporated into the second receiver embodiment of FIG. 8.

FIG. 9 illustrates, for example, a correction circuit in which there are four significant $c$'s following $c_0$. The previously evaluated digits travel down the shift register so that when a given digit, $d_i$, is being evaluated, the last five preceding digits $d_{i-1}$ through $d_{i-5}$ are in the shift register. Resistors $R_1$ through $R_4$ are set to provide voltage gains $c_1$ through $c_4$, respectively, where these $c$'s are the four pulse response samples following $c_0$. By means of these resistors and the summing amplifier 34, the signal $c_1d_{i-1}+c_2d_{i-2}+c_3d_{i-3}+c_4d_{i-4}$ is subtracted from $r(t)$ to obtain $r'(t)$. Similarly, resistors $R_4$ through $R_9$ are set to provide voltage gains proportional to $c_0$ through $c_4$, respectively. These resistors, in conjunction with summing amplifier 38, subtract a signal voltage proportional to $c_0d_{i-1}+c_1d_{i-2}+c_2d_{i-3}c_3d_{i-4}+c_4d_{i-5}$ from $r(t-T)$. The resistors in FIGS. 5 and 9 could be replaced by amplifiers with preset gains, each gain being proportional to the $c$ shown beside the corresponding R on the Figures.

The signal $r'(t-T)$ in FIG. 8, is fed to summer circuits 72 and 73. The signal $r'(t)$ is fed to amplifiers 70 and 71 of gain $G_1$ and $G_2$, respectively. The output of amplifier 70 is fed as an input to summer 72 with the output of amplifier 71 being fed as an input to summer 73.

The desired angles $\theta$ and $\gamma$ in FIG. 7 are precalculated or otherwise predetermined and $G_1$ and $G_2$ of FIG. 8 are set equal to $-\cot\theta$ and $-\cot\gamma$, respectively. The $G_1$ and $G_2$ values can be obtained by preparing a signal area plot, such as FIG. 7, drawing by inspection of the plot the two dividing lines which best separate the signal area for $d_i=0$ from the signal area for $d_i=1$, and measuring $\theta$ and $\gamma$ on the plot. The output from summer 72 is fed to sampler 74, which samples the amplitude of this signal once per baud. Simultaneously, sampler 75 samples the output of summer 73. As in the previously described receiver, FIG. 4, the timing of the samplers is controlled by the reference clock pulses as delayed by the fixed pulse delay 79. Again the sample timing is set to approximately maximize $c_0-c_{-1}$, where these $c$'s are samples of the system pulse response as shown by FIG. 1.

The subtract $r_i$ circuit 36 subtracts from the sampler 74 output a fixed voltage $r_i$, which is equal to the distance from the origin in FIG. 7 to the intersection of line A with the $r'_{i-1}$ axis. In the absence of noise, the output voltage amplitude from the subtract $r_i$ circuit 36 (the corrected sample amplitude) is proportional to $V_1$, the horizontal distance from the received signal to line A, regardless of which of the signals in FIG. 7 is received. The $U_1$ threshold detector 76 generates a positive output pulse when the signal amplitude $U_i$ plus noise is positive and otherwise generates a negative output pulse.

The subtract $r_j$ circuit 37 in FIG. 8 subtracts from the output of sampler 75 a signal $r_j$ equal to the distance from the origin to the o the intersection of line B with the $r'_{i-1}$ axis in FIG. 7. The output signal pulse amplitude from the subtract $r_j$ circuit 37 is proportional to the distance from the origin to the $r_j$ intercept of the $r'_{i-1}$ axis. The V-threshold detector 77 generates a positive output pulse whenever the signal amplitude $V_i$ is positive and otherwise generates a negative output pulse.

Simultaneously, the U-threshold detector and the V-threshold detector 77 each feed a pulse to the output logic 78. The output logic 78 is designed to evaluate each received digit $d_i$ on the basis of the polarities of these two pulses from the U-threshold detector and the V-threshold detector. If the received signal plus noise is to the left of both line A and line B, these two polarities will both be negative and the output logic will decide $d_i=0$. Otherwise, these two polarities will not both be negative and the output logic will decide $d_i=1$.

Figure 10:
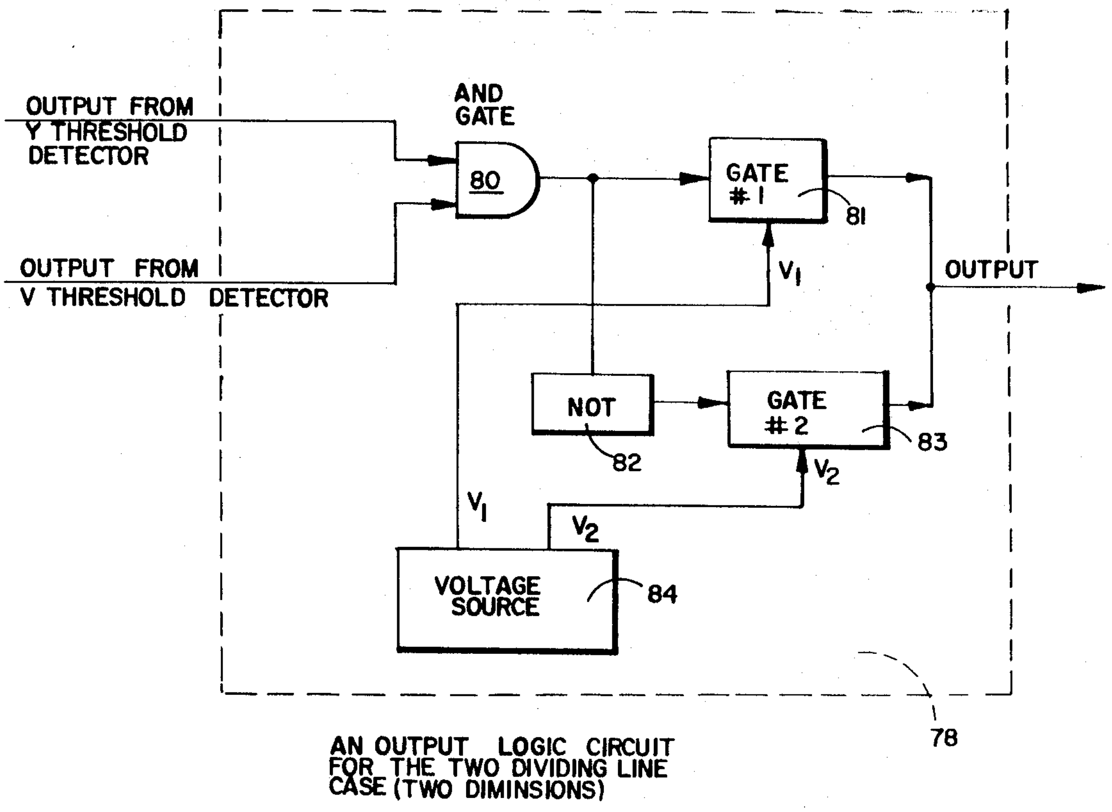
FIG. 10 illustrates in schematic block form a logic circuit for use with the second receiver embodiment illustrated in FIG. 8.

Referring to FIG. 10 wherein is illustrated a schematic block diagram of the output logic block 78, the AND-gate 80 receives as inputs the output signals from threshold detectors 76 and 77. The output of AND-gate 80 is fed to gate 81 and to the NOT-circuit 82. The voltage source 84 provides two outputs, $V_1$ and $V_2$, which are fed to gates 81 and 83, respectively. Gate 83 also receives the output from the NOT-circuit 82. The outputs from gates 81 and 83 are then connected together to provide the system output. In operation, when both threshold detectors generate an output, the AND-gate 80 opens gate 81 which passes a voltage $V_1$ to the output. This voltage represents $d_i=0$. When either or both threshold detectors do not generate an output, the NOT-circuit 82 opens gate 2, admitting a voltage $V_2$ to the output, representing $d_i=1$.

Instead of the voltages $V_1$ and $V_2$, we could simply use a negative and positive pulse to represent binary space and mark, respectively, or vice versa.

Figure 11:
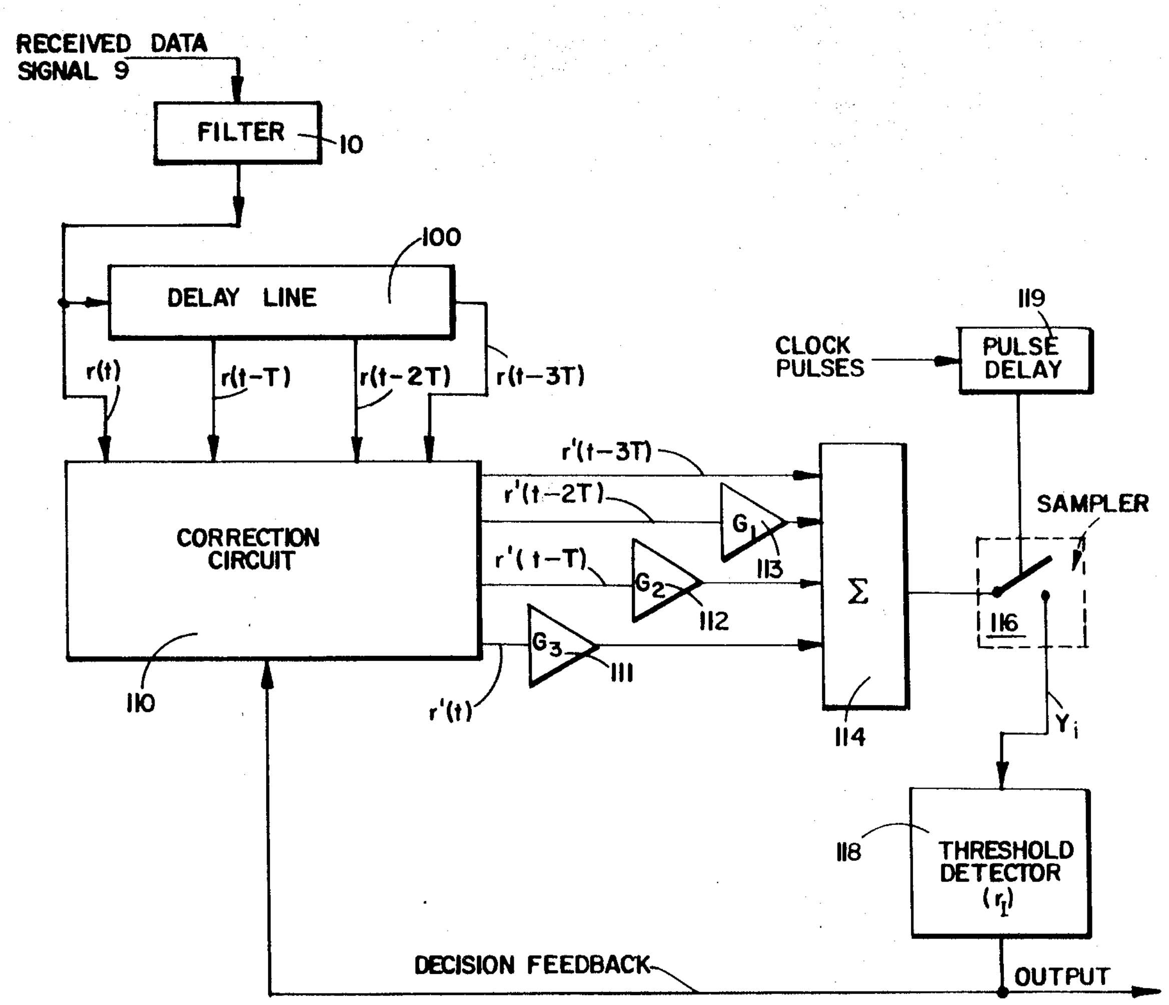
FIG. 11 illustrates in schematic block form a third embodiment of a receiver.

Referring to FIG. 11 wherein is disclosed a receiver implementation which utilizes four signal space dimensions (four signal samples for the evaluation of each digit), with one dividing hyperplane. A filter 10 receives the data signal 9 and forwards the signal after filtering to delay line 100 and to the correction for previous decisions circuit 110. The filter 10 is the same as in FIGS. 4 and 8. The output signal from the filter 10 is designated $r(t)$. The delay line 100 delays the signal by multiples of T, where T is the baud time, to provide three outputs $r(t-T)$, $r(t-2T)$, and $r(t-3T)$. For each baud of delay in the delay line we can use two of the bridge circuits in FIG. 6.

Each of the signals $r(t)$, $r(t-T)$, $r(t-2T)$ and $r(t-3T)$ is fed to the correction circuit 110, along with a decision feedback signal.

Figure 12:
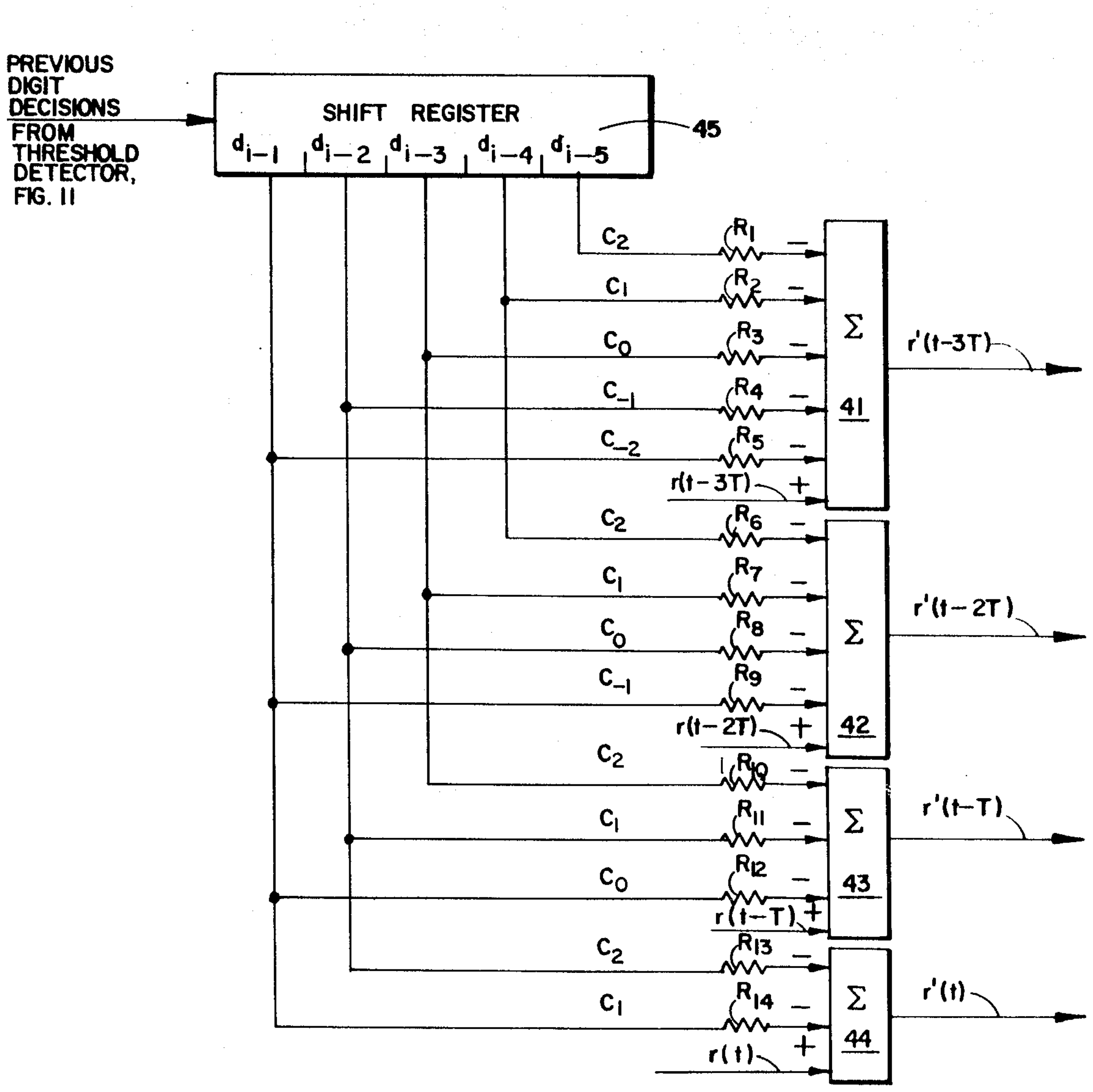
FIG. 12 illustrates in schematic block form a correction circuit for use in the third receiver embodiment of FIG. 11.

FIG. 12 shows the correction circuit for this case of four signal space dimensions. For illustrative purposes it is assumed that there are two significant pulse response samples following $c_0$. The previous digit decisions from the threshold detector, FIG. 11, travel down the shift register 45 and, at any given time, the last five digit decisions $d_1$, $d_{r2}$, $d_{r3}$, $d_{r4}$ and $d_{r7E-5}$ are in the shift register 45. Resistors $R_1$ through $R_5$ are set to provide gains proportional to $c_2$ through $c_{\cdot 7E\cdot 2}$, respectively. In conjunction with these resistors, summing circuit 41 subtracts a voltage proportional to $c_{-2}d_{r1}+c_{-1}d_{r2}+c_0d_i$ $c_1d_{i-4}+c_2d_{i-5}$ from $r(t-3T)$ to obtain $r(t-3T)$. Similarly, resistors $R_6$ through $R_9$ in conjunction with summing circuit 42 subtracts a voltage proportional to $c_{-1}d_{i-1}+c_0d_{i-2}+c_1d_{i-3}+c_2d_{i-4}$ from $r(t-2T)$ to obtain $r(t-2T)$. Resistors $R_{10}$ through $R_{12}$, combined with summing amplifier 43, subtract a voltage proportional to $c_0d_{i-1}+c_1d_{i-2}+c_2d_{i-3}$ from $f(t-T)$, while resistors $R_{13}$ and $R_{14}$, combined with summing amplifier 44, subtract a voltage proportional to $c_1d_{i-1}+c_2d_{i-2}$ from $r(t)$ to obtain $r\ (t)$. From equations such as (1) through (5), one can see that the correction for previous decisions circuit corrects the four signal replicas $r(t)$, $r(t-T)$, $r(t-2T)$ and $r(t-3T)$ for all of the intersymbol interference caused by previously evaluated digits when a given digit, $d_i$, is being evaluated. It is interesting to note also that this correction process takes into consideration not only the pulse response samples following $c_0$, but also those preceding $c_0$.

The $r'(t-3T)$ signal, FIG. 11, is fed directly to a summing means 114. The signal $r'(t-2T)$ is fed to the summing means 114 via amplifier 113, having a gain setting G1. The signal $r'(t-T)$ is fed to the summing means 114 via amplifier 112, amplifier 112 having a gain setting G2. The signal $r'(t)$ is fed to the summing means 114 via the amplifier 111, having a gain setting G3. The output of the summing means is fed to a sampler 116 which samples the summing means' output signal at a clock rate which is determined by the clock pulses from an external source. Again, we use a pulse delay to delay the clock pulses and thereby account for various signal delays in the system and obtain approximately the optimum sample timing, in which $c_0-c_{\cdot 7E\cdot 1}$ is approximately maximized. The output of the sampler 116 is fed to a threshold detector 118, the level of which is set at $r_t$.

In this case we have omitted the subtract $r_t$ circuit shown in the previous receiver implementations and have set the threshold detector at $r_t$ instead of zero. When the threshold detector input voltage $Y_i$ exceeds $r_t$, the threshold detector generates a positive pulse, indicating $d_i=1$. Otherwise, the threshold detector generates a negative pulse, indicating $d_i=0$. The output of the threshold detector, which is the output signal of the system, is also fed back to the previous decision correction circuit 110.

The gain adjustments G's and the threshold detector setting $r_t$ establish a hyperplane in the four-dimensional signal space. The voltage $Y_i$ upon which the $i^{th}$ digit decision is based is the distance from the $i^{th}$ received signal (after correction for previous digit decisions) to the signal space separating hyperplane, where this distance is measured parallel to the $r_{i\cdot 7E\cdot 3}$ axis. In the general case, with more than two signal space dimensions and an arbitrary system pulse response, calculation of the adjustments G's and $r_t$ that establish the optimum separating hyperplane is rather lengthy. However, when the system pulse response is known in advance these calculations can be made in advance and the adjustments can be set in advance rather than learned and automatically adjusted by hardware in the receiver. Usually, these calculations are best performed by an iterative procedure with the aid of a computer. The simplest procedure is to start with all G's and $r_t$ set at zero and then adjust one adjustment at a time by small increments in the direction that increases $Y_i$ until $Y_i$ stops increasing. By thus adjusting each adjustment, one at a time, and proceeding to sequentially adjust all adjustments several times, near-optimum adjustments can be arrived at.

After the hardware has been constructed, an alternate adjustment procedure is to experimentally adjust one adjustment at a time while observing an "eye pattern" display of the signal $Y_i$. By adjusting each adjustment to maximize the opening of the eye pattern and proceeding through all of the adjustments a few times, the optimum adjustments can be obtained.

An alternative implementation uses the perpendicular distance from the received signal to the signal space separating hyperplane. Then the adjustments, G's, become direction cosines of a normal to this hyperplane. When antipodal signaling is used, the intercept adjustment $r_t$ can be set at zero.

While there has been shown what are considered to be the preferred embodiments of the invention, it will be manifest that many changes and modifications may be made therein without departing from the essential spirit of the invention. It is intended, therefore, in the annexed claims, to cover such changes and modifications that fall within the true scope of the invention.

I claim:

1. A digital data receiver which utilizes previous digit decisions to correct a substantial part of the intersymbol interference contained in a received digital data signal within an interval of a few digit durations comprising in combination:

a low-pass filter means for receiving an input digital data signal and for filtering out high-frequency noise components;

a delay means for receiving the filtered signal from said filter means and for delaying said filtered signal for at least one data baud (or digit) to provide a delayed filtered signal;

a correction means for receiving as inputs said delayed filtered signal, said filtered signal and a corrected receiver output signal; said correction means operating upon the corrected receiver output signal to provide two signals equal to the intersymbol interference caused by previously evaluated digits, which signals are subtracted from said delayed filter signal and said filtered signal to eliminate a portion of the intersymbol interference contained in said signals so as to provide a partially corrected filtered signal and a partially corrected delayed filtered signal;

amplifier means for amplifying said partially corrected delayed filtered signal by a preselected gain so as to maximize the linear separation between different levels of said received digital data signal;

summing means for summing the output signal from said amplifier means with the partially corrected filtered signal;

sampling means sampling the output signal from said summing means at substantially the received digit rate; and threshold detector means for determining if the output signal from said sampling means is above or below a predetermined threshold level, feeding the corrected receiver output signal which represents the receivers digit decision back to said correction means.

2. The invention according to claim 1 and further comprising:

a subtracting means interposed between said sampling means and said threshold detector means for subtracting the threshold level of said threshold detector from the sampled output signal and further fixing the threshold level of said threshold detector to zero.

3. A receiver for detecting digital data bits from a distorted waveform input signal which input signal contains digital data bit information and intersymbol interference, comprising in combination:

a delay means connected to receive said input signal, said delay means having a plurality of output taps, each separated by a delay equal to one data bit interval, with delayed input signals available to said taps;

a correction means for receiving as inputs said delayed input signals said received input signal, and a corrected system output signal, said correction means generating from the corrected output signal a plurality of normalized distorted waveforms containing intersymbol components, one of which normalized waveforms is subtracted from each of said delayed output signals and said input signal, respectively, so as to provide partially corrected delayed output signals and a partially corrected input signal;

a first set of amplifier means for amplifying each of said partially corrected delayed signals by preselected gains;

means for summing together the output signals from said amplifier means and said partially corrected input signal;

means for sampling the amplitude of the summed signal from said summing means at substantially the bit interval; and threshold detector means for determining if the sampled signal is above or below a predetermined amplitude level, and for feeding back a corrected system output signal indicative of the determination to said correction means.

4. The invention according to claim 3 and further comprising:

a subtracting means interposed between said sampling means and said threshold detector means for subtracting the threshold level of said threshold detector from the sampled output signal and further fixing the threshold level of said threshold detector to zero.

5. The invention according to claim 3 wherein said previous decision correction means is comprised of:

a delay means connected to receive a corrected system output signal, said delay means having a plurality of equally spaced output taps and an attenuator connected to each delay line tap to provide at each tap a signal which is a component of the distorted waveform input signal;

means for summing said tap signals together to form a normalized waveform signal and for subtracting said normalized waveform signal from said delayed input signals and from said received input signal so as to provide said partially corrected delayed output signals and said partially corrected input signal, respectively.

6. The invention according to claim 3 and further comprising:

a second set of amplifier means for amplifying each of said partially corrected delay signals by preselected gains;

a second means for summing together the output signals from said second set of amplifier means;

a second means for sampling the amplitude of the summed signal from said summing means at substantially the bit interval;

a second threshold detector means for determining if the sampled signal from said second sampling means is above or below a second predetermined amplitude level; and amplitude level and logic means receiving the output signals from said first and second threshold detector means and providing an output signal of a first level when the output from either or both detector means is below said predetermined level, and providing an output of a second level when the output from both of said threshold detector means is above the first and second predetermined levels.

7. The invention according to claim 6 and further comprising:

a subtracting means interposed between each of said sampling means and each of said threshold detector means for subtracting the threshold level of said threshold detector from the sampled output signal and further fixing the threshold level of said threshold detector to zero.

* * * * *